Patented Dec. 12, 1950

2,534,085

UNITED STATES PATENT OFFICE 2,534,085

PREPARATION OF ALKALI ALKYL XANTHATES

Byron M. Vanderbilt, Westfield, and John P. Thorn, Cranford, N. J., assignors to Standard Oil Development Company, a corporation of Delaware No Drawing. Application April 23, 1949, Serial No. 89,366

9 Claims. (Cl. 260—455)

This invention relates to new and useful improvements in the preparation of alkali metal salts of alkyl xanthates.

Alkali metal salts of alkyl xanthates such as sodium ethyl xanthate are useful weed killers, and are also useful as intermediates in the preparation of rubber accelerators, lube oil additives, and the like.

These salts have been prepared in general by the reaction of the corresponding alcoholate with carbon bisulfide or by the reaction of anhydrous alcohol with carbon bisulfide and finely-divided alkali metal hydroxide. These respective reactions are illustrated in the following equations:

(1) 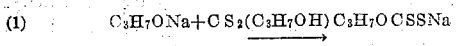

$C_3H_7ONa + CS_2(C_3H_7OH) \rightarrow C_3H_7OCSSNa$

The $C_3H_7OH$ is used above as a diluent or vehicle.

(2) $C_3H_7OH + CS_2 + NaOH \rightarrow C_3H_7OCSSNa + H_2O$

Both of the above-described processes are relatively expensive because of the cost of the alcoholate and the alcohols. In addition, the xanthate product partly dissolves in the alcohol diluent or reactant and thereby complicates the recovery of the product.

It has now been found that alkali metal salts of alkyl xanthates can be prepared by a process utilizing the corresponding dialkyl ethers instead of alcohols and that this process is ideally adapted to overcome the beforementioned difficulties. This is surprising in view of the fact that ethers are normally unreactive, especially in the presence of alkalies. Xanthates of this invention are thus prepared by the reaction of the corresponding dialkyl ether, finely-divided alkali hydroxide and carbon bisulfide.

The equation for the reaction of this invention is illustrated below where isopropyl ether and sodium hydroxide are employed.

$C_3H_7OC_3H_7 + 2CS_2 + 2NaOH \rightarrow 2C_3H_7OCS_2Na + H_2O$

The formula for the compounds prepared according to the method of this invention thus corresponds to the following general formula:

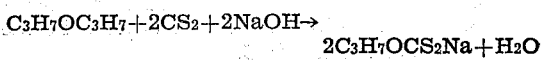

wherein R represents an alkyl radical and X represents an alkali metal such as sodium, potassium, lithium, etc. The alkyl group is derived from the corresponding dialkyl ether and the alkali group from the corresponding alkali hydroxide. Since the alkyl ethers used as reactants in this invention are usually obtained as by-products from the production of the corresponding alcohols, they represent cheaper starting materials than those employed in the prior art.

The dialkyl ethers employed are those that are normally liquid such as diethyl ether, diisopropyl ether and higher. Because of the cost and availability of the ethers, and the utility of the xanthate products, it is preferred to use dialkyl ethers having from 2 to 4 carbon atoms in the alkyl group. If a mixed ether is used as the ether reactant, such as for example, ethyl propyl ether, then a mixture of xanthates is obtained. The mixed ethers would therefore only be used where the mixed product is desired.

The quantities of reactants employed can follow the stoichiometric relations of the equation. In general, however, it is preferred to use the ether in excess in order to drive the reaction to completion.

The xanthate product and any unreacted alkali hydroxide are, in general, comparatively insoluble in the ether and can thus be separated by decantation of the ether. The xanthate product and alkali hydroxide are soluble in water and can thereby, if desired, be washed out of the ether.

Addition of extraneous water to the reaction mixture results in the separation of an upper organic layer and a bottom water layer containing dissolved xanthate product and some alkali hydroxide, the amount of the latter depending upon how far the reaction has proceeded to completion. The organic layer of ether and carbon bisulfide is decanted and can be employed further in the reaction. The alkali metal alkyl xanthate crystallizes out from the water solution at a higher temperature than the alkali hydroxide and is thereby separated. The residual alkali hydroxide aqueous solution is evaporated and the alkali hydroxide can be further used in the process.

The temperature employed in the reaction varies in the range of atmospheric, or 15° C., to 100° C. but the preferred temperature range is in the region of about 50° to 75° C. Temperatures above the boiling point of carbon bisulfide and diethyl ether necessitate moderate pressures in order to keep these components in the liquid phase in the reaction mixture. The reaction is preferably carried out in a high speed shear type agitator as for example a colloidal type dispersion mixer in order to remove the xanthate from the alkali hydroxide surface. Good agitation is particularly important. This type of operation enables the reaction to proceed further to completion.

The process of this invention is especially useful when $C_3$ and higher alkyl xanthates are to be prepared. $C_3$ and higher ethers azeotrope appreciably with water, as does carbon bisulfide with water and with the ethers. This azeotroping occurs within the temperature range of this invention. The reaction can therefore be carried out under distillation conditions with the ether used in excess. The reaction mixture is dehydrated by azeotropic distillation of ethers, carbon bisulfide and water, and the reaction is thereby further driven to completion. The alkali hydroxide can be thus almost completely used up in the reaction and xanthate product separated as a solid from the reaction liquid by simple decantation. Any ether or carbon bisulfide adhering to the xanthate product can be driven off by heating. The ether-water-carbon bisulfide distillate taken overhead from the reaction can be separated into two layers by decantation or the water absorbed by suitable dehydrators. When decantation is used, the ether carbon bisulfide organic layer can be recycled directly to the reaction mixture for further reaction. When dehydrators are employed, the carbon bisulfide and ether can be similarly returned to the reaction mixture.

The azeotrope dehydration can also be employed when ethyl ether is used as a reactant. Since, however, the ethyl ether water azeotrope does not contain as much water as the higher ether water azeotropes, it is not as desirable to use this type operation with ethyl ether as with the higher ethers.

Illustrative figures on some of the azeotropes encountered are as follows:

| | Boiling Point | Water |
|---|---|---|
| | °C. | Per Cent |
| Water, isopropyl ether | 61.4 | 3.6 |
| Carbon bisulfide, water | 42.5 | 3 |
| Ethyl ether, water | 34.1 | 1.3 |

This invention will be better understood by reference to the following examples of the preparation of the indicated compounds according to the process of this invention.

*Example 1*

Equal molar quantities of isopropyl ether (102 grams), carbon bisulfide (76 grams), and sodium hydroxide (40 grams) were placed in a 3-neck one liter flask and agitated for four hours at 40° C. The sodium hydroxide was employed as a finely-divided powder. After four hours, the mixture was added to 200 cc. of water and the ether-carbon bisulfide layer separated. The aqueous layer was found to contain an 18.5% (molar) yield of sodium isoproyl xanthate based on the sodium hydroxide charged.

*Example 2*

Example 1 was repeated except that the mixture was refluxed (50°-52° C.) for 3½ hours. Yield of xanthate was 43.5% of theory.

*Example 3*

A mixture of 148 g. (2 moles) of ethyl ether, 114 g. (1½ moles) of carbon bisulfide, and 50.5 g. (0.9 mole) of finely ground potassium hydroxide were placed in a one-quart pressure bottle and attached to a rotary wheel immersed in a water bath at 60° C. After 3½ hours the mixing was terminated, and the water soluble xanthate and unreacted KOH removed by water extraction. Analysis showed a yield 76½% of theory of ethyl potassium xanthate based on the KOH charged.

*Example 4*

A mixture of 130 g. (1 mole) of n-butyl ether, 76 g. (1 mole) of carbon bisulfide, and 40 g. (1 mole) of finely ground sodium hydroxide were treated in a like manner as in case of Example 3. Yield of xanthate was 83.5% of theory.

In case of the above-mentioned experiments the amount of xanthate was determined by titration of the unreacted alkali to a potentiometrical end point of a pH of 8.0. In a typical run the yield was double checked by oxidation of the xanthate to xanthogen disulfide by means of standard iodine solution.

This invention has been described with respect to specific embodiments but is not intended to be limited thereby.

What is claimed is:

1. A process for preparing alkali metal alkyl xanthates which comprises reacting carbon bisulfide with the corresponding alkali metal hydroxide and the corresponding normally liquid dialkyl ether at a temperature in the range of from 15° to 100° C.

2. A process for preparing alkali metal, alkyl xanthates which comprises reacting carbon bisulfide with the corresponding alkali metal hydroxide and the corresponding normally liquid dialkyl ether at a temperature in the range of from about 50° to 75° C.

3. A process for preparing compounds corresponding to the formula:

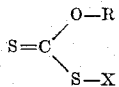

wherein R is an alkyl radical having from 2 to 4 carbon atoms and X is an alkali metal which comprises reacting carbon bisulfide with the corresponding alkali metal hydroxide and the corresponding dialkyl ether at a temperature in the range of from 15° to 100° C.

4. A process for preparing compounds corresponding to the formula:

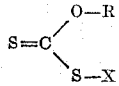

wherein R is an alkyl radical having from 2 to 4 carbon atoms and X is an alkali metal which comprises reacting carbon bisulfide with the corresponding alkali metal hydroxide and the corresponding dialkyl ether at a temperature in the range of from 50° to 75° C.

5. A process as in claim 4 in which the compound being prepared is sodium isopropyl xanthate, the alkali metal hydroxide is sodium hydroxide and the dialkyl ether is isopropyl ether.

6. A process as in claim 4 in which the compound being prepared is potassium ethyl xanthate, the alkali metal hydroxide is potassium hydroxide and the dialkyl ether is ethyl ether.

7. A process as in claim 4 in which the compound being prepared is sodium n-butyl xanthate, the alkali metal hydroxide is sodium hydroxide and the dialkyl ether is n-butyl ether.

8. A process for preparing compounds corresponding to the formula:

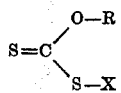

wherein R is an alkyl radical having from 2 to 4 carbon atoms and X is an alkali metal which comprises the steps of reacting carbon bisulfide with the corresponding finely-divided alkali metal hydroxide and the corresponding dialkyl ether, at a temperature in the range of from about 50° to 75° C. in a reaction zone; dehydrating the resulting reaction mixture by azeotropic distillation to take overhead a distillate fraction of carbon bisulfide, dialkyl ether and water; condensing this distillate fraction; separating the water from the carbon bisulfide and alkyl ether and recycling the alkyl ether and carbon bisulfide to the reaction zone.

9. A process for preparing sodium isopropyl xanthate which comprises the steps of reacting finely-divided sodium hydroxide, carbon bisulfide and isopropyl ether at a temperature in the range of from 50° to 75° C. in a reaction zone; dehydrating the resulting reaction mixture by azeotropic distillation to take overhead a distillate fraction comprising isopropyl ether, carbon bisulfide and water; condensing this distillate fraction; decanting the condensate into an organic layer of isopropyl ether and carbon bisulfide and a water layer and recycling the organic layer to the reaction zone.

BYRON M. VANDERBILT.
JOHN P. THORN.

REFERENCES CITED

The following references are of record in the file of this patent:

UNITED STATES PATENTS

| Number | Name | Date |
|---|---|---|
| 1,970,508 | Christmann et al. | Aug. 14, 1934 |